July 15, 1958 K. SCHWARTZ 2,843,180
WALKERS' AIDS
Filed March 11, 1954 2 Sheets-Sheet 1
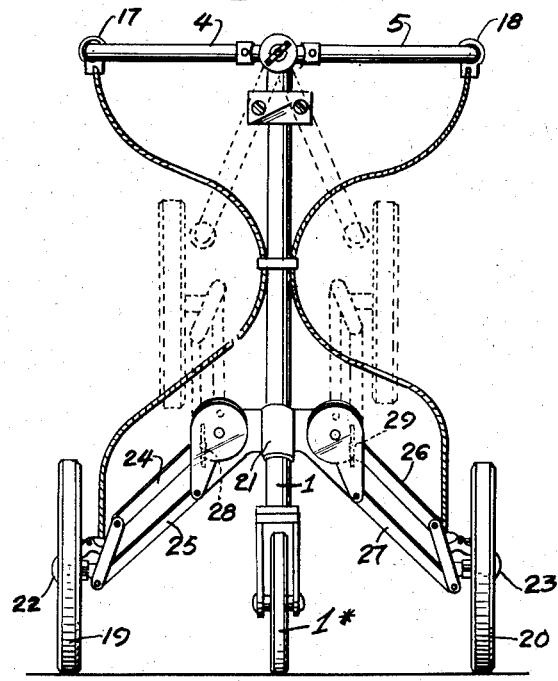
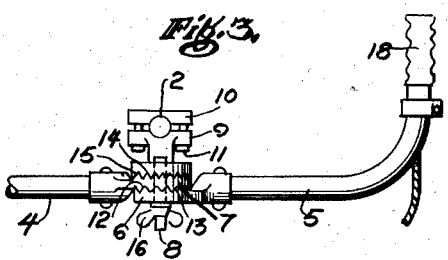
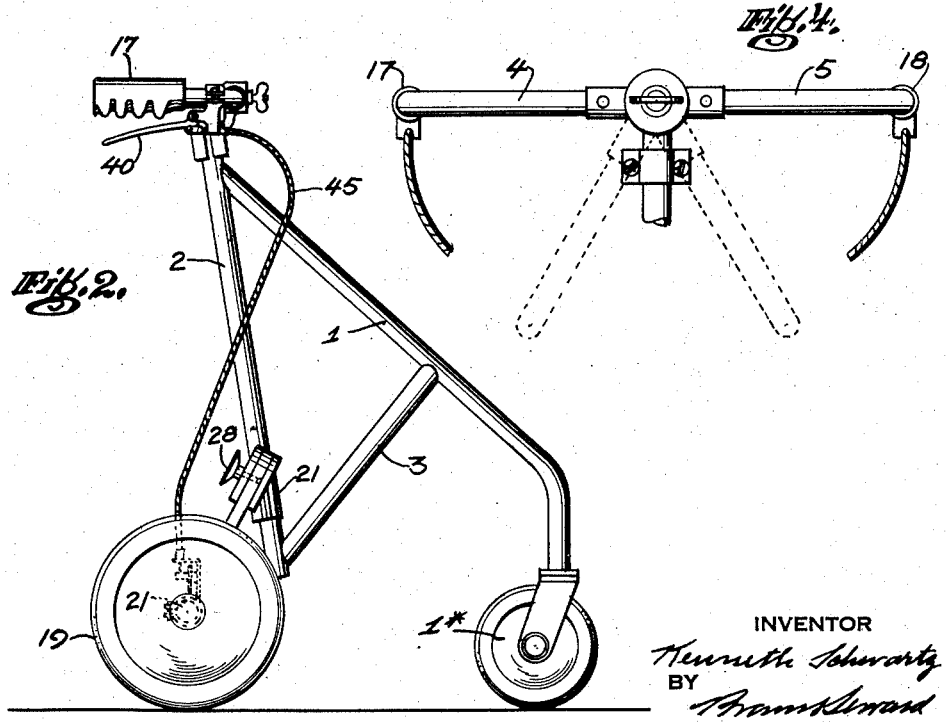
INVENTOR
Kenneth Schwartz
BY
Frank Leward
ATTORNEYS July 15, 1958  K. SCHWARTZ  2,843,180
WALKERS' AIDS
Filed March 11, 1954  2 Sheets-Sheet 2
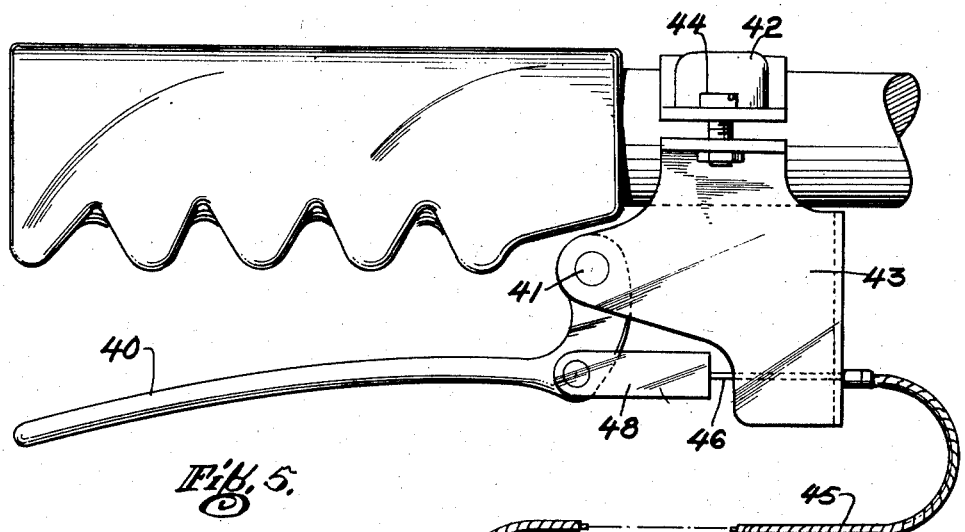
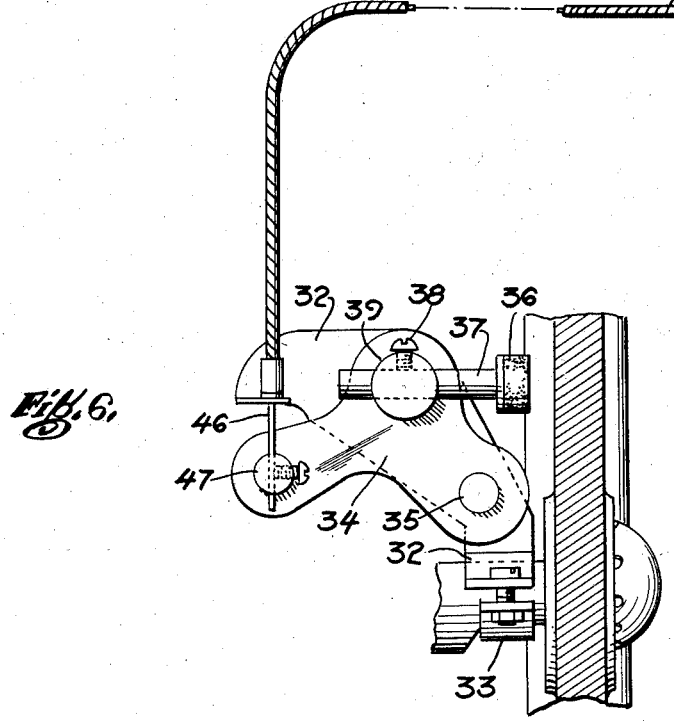
INVENTOR
Kenneth Schwartz
BY
ATTORNEYS

United States Patent Office 2,843,180
Patented July 15, 1958

2,843,180

WALKERS' AIDS

Kenneth Schwartz, Madison, Wis.

Application March 11, 1954, Serial No. 415,568

4 Claims. (Cl. 155—22)

This invention is directed to improvements in walkers' aids especially designed for use by persons having seriously advanced problems brought about through muscular dystrophy.

One object of this invention is to provide a three-wheeled walker's aid which will be light, strong and easily controlled, and in which rear traction wheels may be independently braked by the person using the aid, to prevent any undesired movement of the aid.

A further object is to provide a walker's aid in which the rear traction wheels may be folded against the frame, means being provided whereby the wheels may be maintained in parallelism with the frame whether the wheels are in their folded or unfolded position.

A further object is to provide a transverse handle bar comprising two foldable members so that when the rear traction wheels and the handle bar members are folded, the walker's aid will be very compact and convenient for transportation.

A practical embodiment of this invention is represented in the accompanying drawings, in which:

Fig. 1 represents a front view of the aid;

Fig. 2 represents a side view of the aid;

Fig. 3 represents a detail plan view on an enlarged scale, of the connection of the handle bar members with the frame;

Fig. 4 represents a front view, on an enlarged scale, of the handle bar;

Fig. 5 represents a side view, on an enlarged scale, of one of the handle bar members, and Fig. 6 represents a detail section on an enlarged scale showing the brake at one of the rear wheels.

The frame of the walker's aid is shown as comprising front and rear portions 1 and 2 diverging downwardly from their united upper ends, said front and rear portions being connected by a brace portion 3. These frame portions are all located in the same longitudinal vertical plane.

The front traction wheel 1* is swivelled to the lower end of the front frame portion 1.

The handle bar is shown herein as comprising two members 4 and 5 projecting laterally and rearwardly from the top of the frame; said members having overlapping clutch elements 6 and 7 pivoted on a pin 8 projecting forwardly from one part 9 of a bracket clamped by the other part 10 and the screws 11 to the upper end of the rear frame portion 2. The contact surfaces of the clutch elements 6 and 7 are provided with interlocking annular series of radially disposed teeth 12 and 13. The contacting surfaces of the bracket part 9 and the clutch element 7 are also provided with interlocking annular series of radial teeth 14 and 15.

The handle bar members 4 and 5 are clamped in either their folded, unfolded or intermediate position by providing a clamp nut 16 threaded on the pivot pin 8. These handle bar members are thus independently adjustable to any position between their folded and unfolded positions. The outer ends of the handle bar members are directed rearwardly and are shown as being provided with hand grips 17 and 18.

The pair of rear traction wheels are denoted by 19 and 20 and they are shown herein as foldably connected to the bracket 21 fast on the lower end of the rear frame portion 2 on both sides of the frame.

The axially alined laterally directed axles 22 and 23, on which the rear traction wheels 19 and 20 are rotatably mounted in planes parallel to the side frame, are shown as connected to the outer ends of two pairs of parallel rods 24, 25 and 26, 27, the inner ends of the said rods being hingedly connected at different points to the said bracket 21. Releasable pins 28 and 29 serve to lock the rear wheels in parallelism with the frame when in their unfolded or folded position.

It will be noted that the axles of these rear wheels are shown as located to the rear of the hinged connection of the handle bar members to the frame for stabilizing the aid when in use.

Each of the devices for braking the rear wheels independently of each other is shown as comprising the following elements: A two-member bracket 32, 33 is clamped to the rear wheel axle. A rock-lever 34 is pivoted at 35 to the upper member of the bracket. A brake shoe 36 has its shank 37 slidably adjustable in a stud 39 carried on the upper bracket member. A screw 38 serves to secure the brake shoe in its properly adjusted position.

The brake shoe 36 is operated from one of the handle bar members by means of a rock-lever 40 pivoted at 41 to the bracket 42, 43, which is clamped around the handle bar member by the screws 44 adjacent the hand grip. A flexible tube 45 connects the lower bracket member 43 at the handle bar with the upper bracket member 32 at the rear wheel axle. A flexible connection, as a wire 46, leads from the stud 47 on the rock lever 34 upwards through the flexible tube 45 to the end piece 48 pivoted to the hand lever 40.

It will be seen that the walker's aid, constructed substantially as herein shown and described, permits the person using the aid to have full control of its movement, either forward or backward or in turning. It will furthermore be seen that the aid, with its large traction wheels, may be easily propelled on lawns as well as on floors and other flat surfaces. It will also be seen that the handle bar members may be readily adjusted to suit different persons.

It is evident that various changes may be resorted to in the form, construction and arrangement of the several parts without departing from the spirit and scope of this invention.

What I claim is:

1. In a three-wheeled walker's aid, a vertical frame comprising, downwardly diverging front and rear portions and a brace connecting them, a transverse handle bar having two interconnected foldable members pivoted to said frame, means for locking the two members together and to the frame in different adjustments, a front wheel swivelled to the frame to turn independently of the handle bar, two foldable rear wheels connected to the frame on both sides thereof, and means for maintaining the rear wheels in parallelism with the frame in both their folded and unfolded positions.

2. The structure as set forth in claim 1, in which brakes are provided for both of said rear wheels and, means are provided on the handle bar members for separately operating said brakes.

3. In a three-wheeled walker's aid, a vertical frame comprising downwardly diverging front and rear portions and a brace connecting them, a transverse handle bar having two interconnected foldable members pivoted to the upper end of the rear portion of the frame, means for locking the two members together and to the said rear portion of the frame in different adjustments, a front wheel swivelled to the lower end of the front portion of the frame, to turn independently of the handle bar, two foldable rear wheels connected to the said rear portion of the frame on both sides thereof, and means for maintaining the rear wheels in parallelism with the frame in both their folded and unfolded positions.

4. The structure as set forth in claim 3, in which brakes are provided for both of said rear wheels and means are provided on the handle bar members for separately operating said brakes.

References Cited in the file of this patent

UNITED STATES PATENTS

| | | |
|---|---|---|
| D. 163,065 | Powell | Apr. 24, 1951 |
| 807,409 | Whitaker | Dec. 12, 1905 |
| 1,177,582 | Murphy | Mar. 28, 1916 |
| 2,077,569 | Kish | Apr. 20, 1937 |
| 2,211,164 | Rippenbein | Aug. 13, 1940 |
| 2,598,046 | Frey | May 27, 1952 |
| 2,616,725 | East | Nov. 4, 1952 |
| 2,654,416 | Maniscalco | Oct. 6, 1953 |
| 2,732,004 | Forbes | Jan. 24, 1956 |
| 2,774,605 | Schladebach | Dec. 18, 1956 |
| 2,792,874 | Sundberg | May 21, 1957 |

FOREIGN PATENTS

| | | |
|---|---|---|
| 167,057 | Germany | Jan. 31, 1906 |
| 988,280 | France | Apr. 25, 1951 |